United States Patent [19]

Eilles

[11] Patent Number: 4,905,463
[45] Date of Patent: Mar. 6, 1990

[54] SINGLE ACTION WHEEL HEIGHT ADJUSTER

[75] Inventor: Frank A. Eilles, Caledon Hills, Canada

[73] Assignee: Canadiana Outdoor Products Inc., Brampton, Canada

[21] Appl. No.: 278,985

[22] Filed: Dec. 2, 1988

[51] Int. Cl.⁴ ............................................. A01D 34/74
[52] U.S. Cl. .................................. 56/17.2; 280/43.13
[58] Field of Search ...................... 56/17.2, 17.1, 17.5, 56/255, DIG. 24; 280/43.13, 43.17

[56] References Cited

U.S. PATENT DOCUMENTS

| | | | |
|---|---|---|---|
| 3,190,061 | 6/1965 | Gilbertson | 56/17.5 |
| 3,226,920 | 1/1966 | Gilbertson | 56/255 |
| 3,357,715 | 12/1967 | Plamper et al. | 280/43.13 |
| 3,577,714 | 5/1971 | Dahl | 56/17.2 |
| 3,677,574 | 7/1972 | Cyr | 280/43.13 |
| 3,972,160 | 8/1976 | Boswell | 56/17.2 |
| 4,006,580 | 2/1977 | Kalleicher | 56/17.2 |
| 4,167,093 | 9/1979 | Pfeiffer et al. | 56/17.2 |

Primary Examiner—Jerome W. Massie, IV
Assistant Examiner—Terry Lee Melius
Attorney, Agent, or Firm—Kenneth M. Garrett

[57] ABSTRACT

In a lawnmower including a housing and wheels for supporting the housing from a ground surface, a wheel height adjusting mechanism including a crank arm associated with each wheel, the crank arms being coupled together for the conjoint movement thereof, the coupling including a shaft mounted from the housing for rotation about its axis, the improvement comprising a gear secured to the shaft for rotation therewith, a plunger supported from the housing so as to be movable between a first position interfering with the gear means and a second non-interfering position, and a spring biasing the plunger to the first position. The plunger may be trigger operated, and the trigger associated with a deck mounted handle. A safety flap may be mounted from the shaft to maintain a relatively constant height from the ground as the wheel height is adjusted.

12 Claims, 2 Drawing Sheets

4,905,463

SINGLE ACTION WHEEL HEIGHT ADJUSTER

FIELD OF INVENTION

This invention relates to lawnmowers. It particularly relates to lawnmowers having a single control for the adjustment of the cutting height by means of wheel height adjusters.

BACKGROUND OF INVENTION

Lawnmowers of the foregoing type are shown in U.S. Pat. Nos. 3,972,160 to Boswell, and 4,167,093 to Pfeiffer et al. The wheel height adjusting mechanism of such lawnmowers includes a crank arm mounting each wheel, and means coupling the crank arms for conjoint movement. Spring means is provided biasing the mechanism towards a maximum cutting height position.

In Boswell a lever is secured to one of the crank arms, to permit the rotation of the crank by manual pressure; detents are provided to lock the lever in any selected position.

In Pfeiffer et al, a lever is provided to selectively engage or disengage a front to rear link forming part of the height adjusting mechanism.

In lawnmowers particularly of the rotary blade type it is desirable to provide a safety flap positioned adjacent the rear of the lawnmower to protect the operators feet in the event that debris is forcefully ejected from the cutting chamber. Where the flap is rigidly secured to the housing, it will be less effective where the housing is raised to provide maximum cutting height. This problem is overcome by hinging the flaps to the housing, but this causes the flaps to drag over the ground surface.

It is an object of this invention to provide improvements to single control wheel height adjusting mechanisms.

It is another object of this invention to provide a flap height compensating arrangement for automatically adjusting the flap height as the wheel height is altered, to provide a constant flap height.

SUMMARY OF INVENTION

In accordance with one embodiment of the invention, a lawnmower including a housing and wheels for supporting the housing from a ground surface, a wheel height adjusting mechanism including a crank arm associated with each wheel and means coupling the crank arms for the conjoint movement thereof, which means includes a shaft mounted from said housing for rotation about its axis, the improvement comprises gear means secured to the shaft for rotation therewith, and plunger means supported from the housing so as to be movable between a first position interfering with the gear means and a second non-interfering position, and spring means biasing the plunger to the first position.

Preferably, the gear means is an internal gear, and the plunger is upwardly biased to said first position. Also preferably, the gear means includes travel stop limits for the height adjuster.

Suitably, the plunger has an elongated opening in the lower end thereof through which the shaft passes, to provide a travel limit for the plunger.

Desirably, a trigger is provided operatively connected to actuate the plunger. The trigger may be located in any convenient position. However, in accordance with the preferred embodiment, the trigger is mounted from a handle rigidly secured to the housing, whereby the trigger is operable by a single hand while grasping the handle. This will permit the weight of the lawnmower to be taken from the wheels when the height is adjusted, which is often desirable after a prolonged period of use of a poorly maintained lawnmower.

In accordance with another embodiment of the invention, in a lawnmower including a housing and wheels for supporting the housing from a ground surface, wheel height adjusting mechanism including a wheel axle and crank arm associated with each said wheel, and rotary shaft means coupling at least a pair of transversely opposed crank arms for the conjoint movement thereof, there is provided a flap and means connecting the flap to the shaft means so as to maintain a more or less constant height relative to the ground surface as the shaft means is rotated to adjust the wheel height.

Suitably, the means mounting the flap comprises one or more flap cranks secured to the shaft means in radial alignment with the associated crank arms, the coupled crank arms and flap crank or cranks having a similar effective radius.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
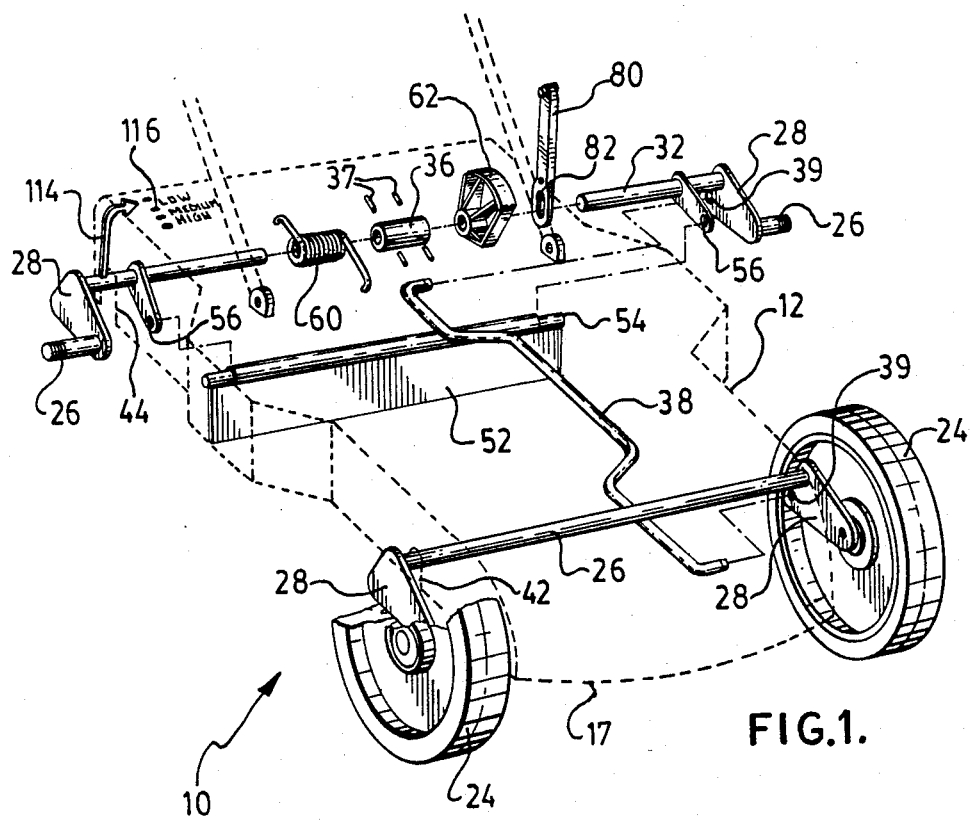
FIG. 1 shows a lawnmower in accordance with the invention in schematic, exploded, cut-away form, in a front, top perspective view, with the deck portion thereof in dashed outline, so as to reveal salient portions of the wheel height adjusting mechanism and flap mounting mechanism.
Figure 3:
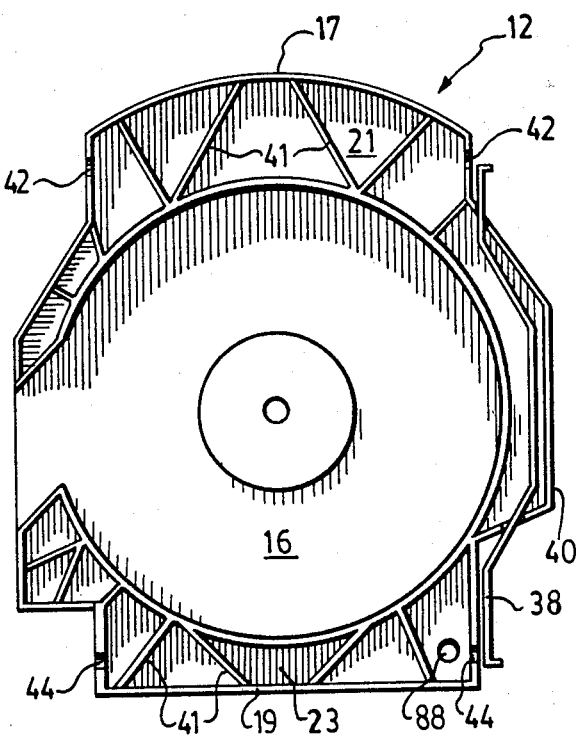
FIG. 3 shows in plan view from below the housing of the lawnmower and the front to back link of the wheel height adjusting mechanism.
Figure 2:
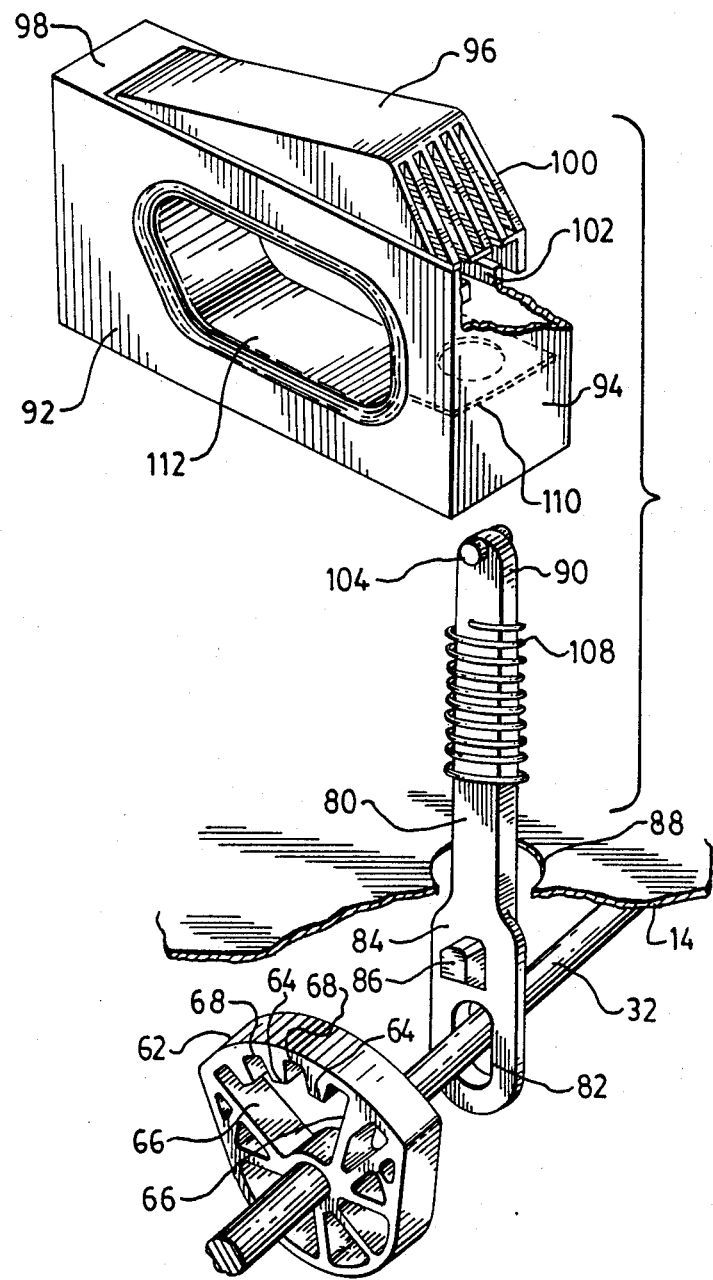
FIG. 2 shows in exploded cut-away view detail of the trigger actuated control for the wheel height adjusting mechanism of the invention.

Considering now the drawings in detail, a lawnmower constructed in accordance with the invention is shown somewhat schematically in FIG. 1 wherein it is identified generally therein by the numeral 10. Lawnmower 10 comprises a housing 12 shown in dashed outline including a deck 14, and walls dependent therefrom defining a cutting chamber 16, a front apron wall 17 and a rear apron wall 19, defining front apron and rear apron enclosures 21 and 23 respectively. Lawnmower 10 further comprises wheels 24, each wheel being mounted from a wheel axle 26, each wheel axle in turn being supported from a crank arm 28. The crank arms 28 associated with the forward wheels 24 are interconnected with a solid shaft 30, while the rear wheels are interconnected by shaft portions 32, 34 rigidly coupled together by a sleeve 36 and pins 37, as will be described later in more detail. The crank arms 28 on one lateral side of lawnmower 10 are coupled together with a link 38 which engages openings 39 in crank arms 28. Housing 12 further comprises a valance wall 40 downwardly depending from deck 14 on one lateral side thereof to form a shroud for link 38. A plurality of stiffening ribs 41 are provided between the depending walls 16, 17, 19 and 40. Housing 12 is provided with front bearings 42 locating in the front apron wall 17 for mounting shaft 30 for rotation about its axis therein, and rear bearings 44 locating in rear apron wall 19 for similarly mounting coupled shaft portions 32, 34.

Intermediate the axial ends of each of shaft portions 32, 34 there is secured a crank arm 50, which may also be referred to as flap cranks, and which are generally in radial alignment with wheel crank arms 28 and have a similar effective radius. A flap 52 is hingedly connected to flap cranks 50 by a rod 54 secured in openings 56 in the flap cranks, so as to be downwardly dependent therefrom. It will be appreciated that as coupled shaft portions 32, 34 are rotated about their axis, a corresponding rotary movement will be transmitted through link 38 to shaft 30, thereby causing the conjoint rotation of crank arms 28 to raise or lower housing 12, while retaining flap 52 at a constant height relative to wheel 24.

In this instance lawnmower 10 is considered to be unidirectional; in a bi-directional lawnmower shaft 30 would be provided with a flap crank arrangement similar to that provided by flap cranks 50 and flap 52.

A helical torsion spring 60 is captured on shaft portion 34, with opposed ends of the spring being restrained respectively by housing 12 and shaft 34. An internal gear section 62 is rigidly secured to shaft portion 32. By internal gear is meant a gear having inwardly directed teeth 64, of which there are here provided three; the plurality of teeth 64 are flanked by a radial stop-wall 66 on each side of the sector, thereby forming four slots 68. A plunger 80 having an elongated opening 82 therethrough adjacent the lower end thereof is captured on shaft portion 32 which presses through the elongated opening. Plunger 80 has a planar face 84 on the side thereof facing gear section 62, and is contiguous therewith. Plunger side face 84 is provided on the median line thereof with a spur projection 86, which is proportioned to engage slots 68 in gear sector 62. Deck 14 is provided with an opening 88 therein in communication with the rear apron enclosure 23, through which opening passes the upper end 90 of plunger 80.

A handle 92 is rigidly secured to deck 14 over rear apron enclosure 23. The forward end 94 of handle 92 is hollow, to permit the free passage of the upper end 90 of plunger 80 to pass therethrough. A trigger 96 is pivotally mounted adjacent the rearward end 98 in the upper side of handle 92. The forward end 100 of trigger 96 is provided with a slotted opening 102 in which is captured a trunnion pin 104 secured to the upper end 90 of plunger 80. A helical compression spring 108 is captured on the upper end 90 of plunger 80; the lower end of spring 108 bears on a wall 110 provided in handle 92, the upper end of the spring bearing on trigger 96, thereby biasing the trigger upwardly, and plunger 80 therewith. Handle 92 is provided with an opening 112 therethrough, thereby permitting trigger 96 to be actuated simultaneously in a single handed operation while gripping handle 92.

Considering now the operation of the height adjustment mechanism, the depression of trigger 96 against the biasing action of compression spring 108 will cause spur protection 86 to disengage from a slot 68 in gear sector 62, thereby permitting the gear sector to rotate, together with coupled shaft portions 32, 34 and shaft 30 therewith. Torsion spring 60 provides a biasing force to urge gear sector 62 in a direction to raise housing 12 relative to wheels 24 until one stop wall 66 is driven into abutment with spur projection 86, to form an upper travel limit for the height adjustment. The application of manual pressure to handle 92 while trigger 96 is depressed will cause gear sector 62 to rotate counter to the biasing force of spring 60, thereby lowering housing 12, until the other stop wall 66 is driven into abutment with spur projection 86, so forming a lower travel limit to the height adjustment. Upon release of trigger 96, compression spring 108 will urge trigger 96 upwardly, and plunger 80 therewith, causing spur projection 86 to engage in a slot 68 to select the desired height of housing 12 from the ground. The upper travel limit of plunger 80 is provided by the lower periphery of elongated opening 82 when this moves into contact with shaft portion 32.

The selected height of the adjustment mechanism is conveniently indicated by an arm 114 which connected to shaft portion 34 so as to be rotatable therewith, and indicia 116 on deck 14.

It will be apparent that the invention may be embodied in many different forms some of which may be preferred according to particular circumstances and it is intended that all such embodiments should be covered by the spirit of the claims appended hereto.

I claim:

1. In a lawnmower including a housing and wheels for supporting the housing from a ground surface, a wheel height adjusting mechanism including a crank arm associated with each said wheel and means coupling said crank arms for the conjoint movement thereof, said means including a shaft mounted from said housing for rotation about its axis;

gear means coupled to said shaft for rotation therewith;

plunger means supported from said housing so as to be movable between a first position interfering with said gear means and a second non-interfering position, and spring means biasing said plunger means to said first position; the improvement comprising:

handle means rigidly secured to said housing;

trigger means mounted from said handle means so as to be operable by a single hand grasping said handle means; and means operatively connecting said plunger means to said trigger means for actuation thereby, and wherein said gear means is an internal gear.

2. A lawnmower as defined in claim 1, wherein: said plunger means is upwardly biased to said first position; and said plunger means has an elongated opening in the lower end thereof through which said shaft passes to capture said plunger means and form a travel limit therefor.

3. A lawnmower as defined in claim 1, wherein there is provided spring means for biasing said height adjusting mechanism in a direction to raise said housing.

4. A lawnmower as defined in claim 3, wherein said spring means comprises a helical torsion spring captured on said shaft.

5. A lawnmower as defined in claim 1, wherein said coupling means includes a link coupling crank arms at axially opposed ends of said lawnmower.

6. A lawnmower as defined in claim 1, wherein said housing includes a valance wall along one lateral side thereof to form a shroud for said link.

7. A lawnmower as defined in claim 1, wherein said shaft has at least one flap crank secured thereto in radial alignment with said crank arms, and a downwardly depending flap hingedly supported from said flap crank.

8. A lawnmower as defined in claim 1, further comprising an indicator arm connected to said shaft to be rotatable therewith and positioned to give a visual indication of the selected cutting height.

9. A lawnmower as defined in claim 8, wherein said flap crank and said crank arms have a similar effective radius.

10. A lawnmower as defined in claim 1, wherein said housing includes an apron wall defining an apron enclosure and said shaft and gear locate within said enclosure.

11. A lawnmower as defined in claim 1, wherein said gear means includes travel limit means.

12. In a lawnmower including a housing and wheels for supporting the housing from a ground surface, wheel height adjusting mechanism including a wheel axle and crank arm associated with each said wheel, and rotary shaft means coupling at least a pair of transversely opposed crank arms for the conjoint movement thereof, a flap, means mounting said flap from said shaft means so as to maintain a relatively constant height from said ground surface as said shaft means is rotated to adjust the wheel height; the improvement wherein said means mounting said flap comprises at least one flap crank secured to said shaft in radial alignment with said wheel cranks associated with said shaft means, said flap crank and associated wheel cranks coupled by said shaft means having a similar effective radius.

* * * * *